June 18, 1963      K. HEHL      3,094,284
FLASH UNIT AND MAGAZINE THEREFOR
Filed Oct. 10, 1960      3 Sheets-Sheet 1
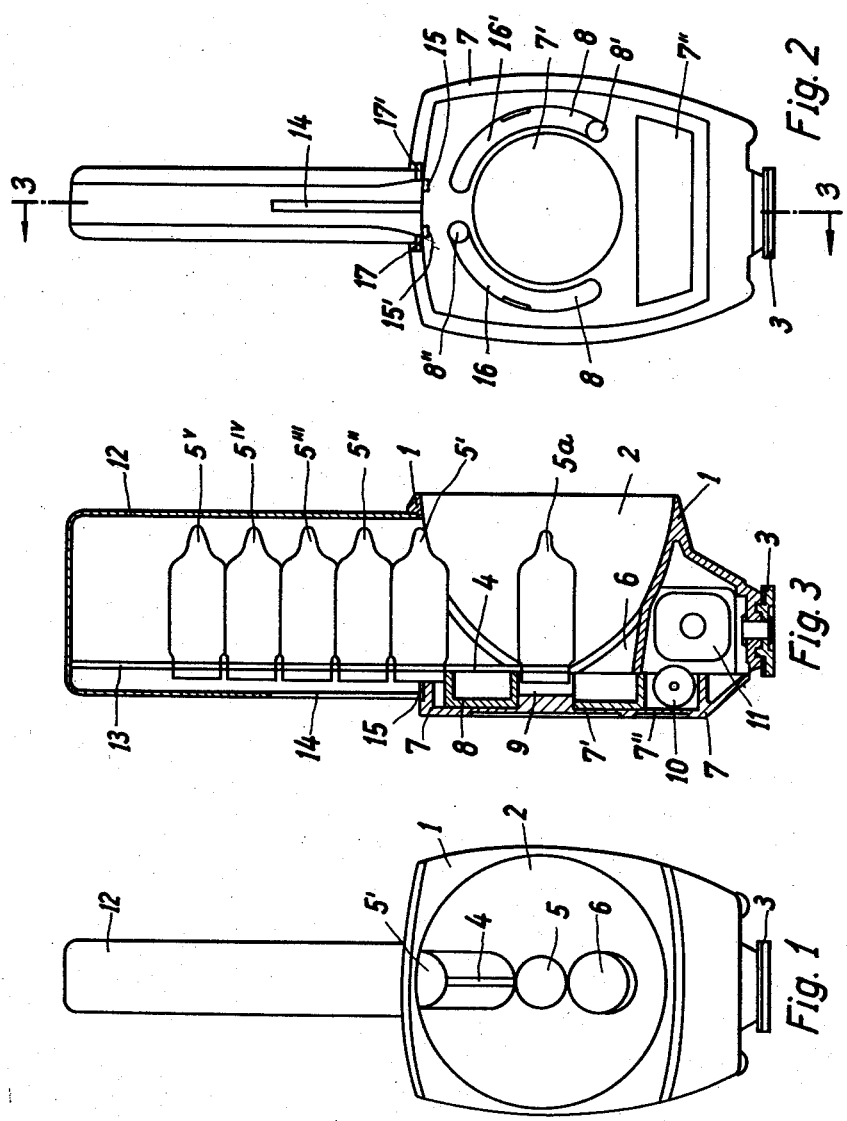
Inventor:
Karl Hehl
by: George H. Spencer
attorney

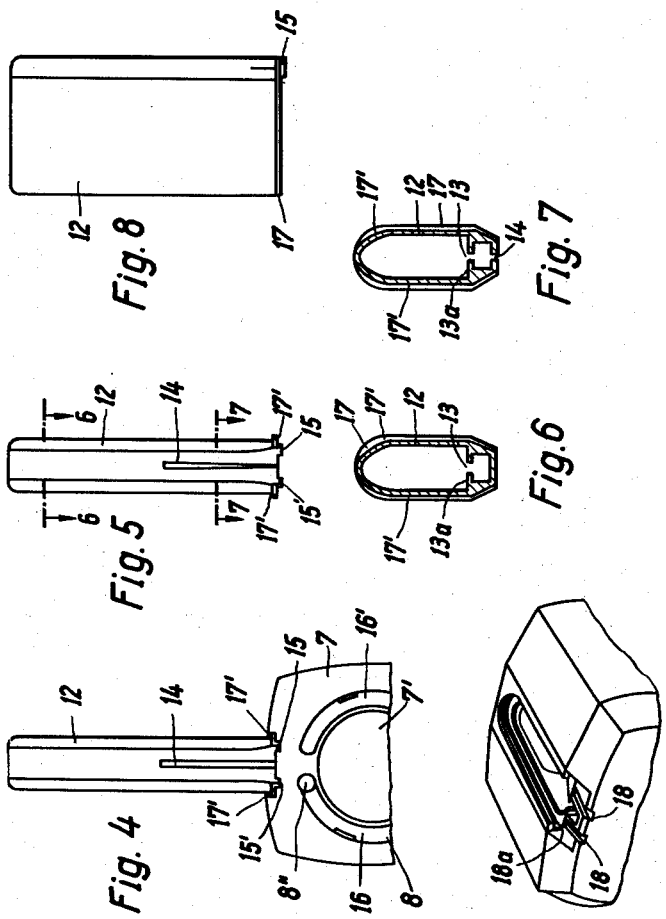

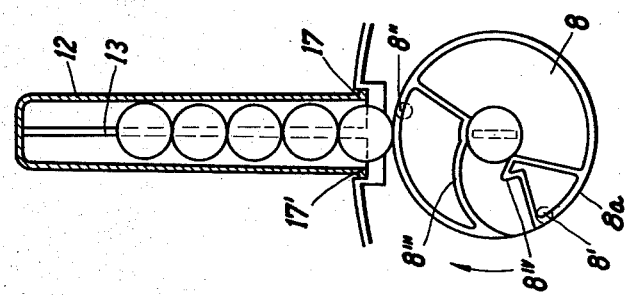
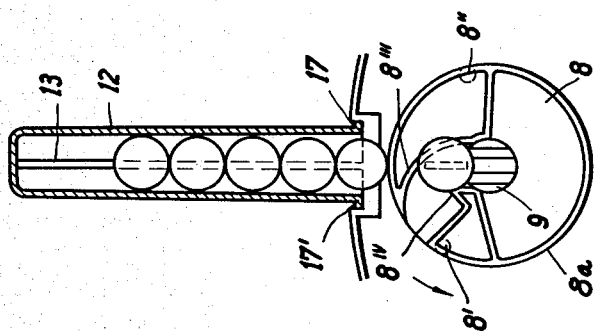
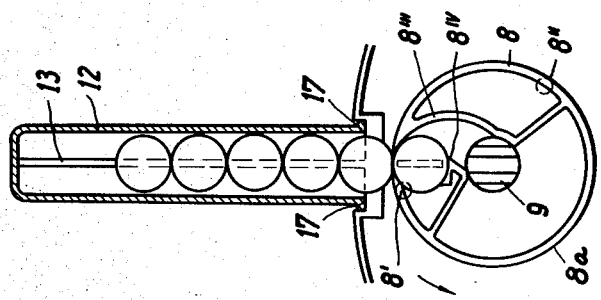

United States Patent Office 3,094,284
Patented June 18, 1963

3,094,284
FLASH UNIT AND MAGAZINE THEREFOR
Karl Hehl, Lossburg, Wurttemberg, Germany, assignor to ARBURG-Feingeraetefabrik oHG, Hehl & Söhne, Lossburg, Wurttemberg, Germany
Filed Oct. 10, 1960, Ser. No. 61,728
Claims priority, application Germany Aug. 23, 1960
7 Claims. (Cl. 240—1.3)

The present invention relates to a flash unit and a magazine therefor.

More particularly, the present invention relates to a flash unit, i.e., a unit capable of producing short intense spurts of light, such as are needed, for example, for photographic purposes, which unit is equipped with a magazine containing a supply of flash bulbs so that spent bulbs may be replaced by fresh bulbs.

Existing flash units are equipped with complicated storage devices which hold the supply of flash bulbs as well as with complicated mechanisms for moving the bulbs from the storage device to the socket and for ejecting the spent bulbs from the socket.

It is, therefore, an object of the present invention to provide a magazine-equipped flash unit which overcomes the above disadvantages.

It is another object of the present invention to provide a magazine-equipped flash unit which is of simple construction and which can readily be mass-produced at low cost.

It is a further object of the present invention to provide a flash unit which incorporates a feed mechanism having but a single movable part.

The objects of the present invention also include the provision of a container for flash bulbs which container itself can be used as the magazine for a flash unit.

With the above objects in view, the present invention resides mainly in a flash unit comprising a housing having a flash bulb socket, a flash bulb magazine adapted to contain a series of consecutive flash bulbs, and a transport device for receiving the flash bulbs from the magazine, for feeding them to the socket and for, thereafter, ejecting them from the housing. The magazine has a slotted attaching portion adapted to be spread apart and to be mounted on the housing in spread apart condition with the series of flash bulbs arranged one above the other, so that the bulbs are fed into the housing solely under the influence of gravity. The magazine itself may constitute the original container for the flash bulbs, so that the purchaser can attach the container directly to the flash unit without having to load flash bulbs into a magazine.

Additional objects and advantages of the present invention will become apparent upon consideration of the following description when taken in conjunction with the accompanying drawings, in which:

FIGURE 1 is a front view of a flash unit with the flash bulb magazine being attached thereto.

FIGURE 2 is a rear view of the unit shown in FIGURE 1.

FIGURE 3 is a sectional view taken on the line 3—3 of FIGURE 2.

FIGURE 4 is a fragmentary view showing part of the structure of FIGURE 2.

FIGURE 4a shows the top of the flash unit housing.

FIGURE 5 is a view similar to that of FIGURE 4 but showing only the magazine.

FIGURE 6 is a sectional view taken on the line 6—6 of FIGURE 5.

FIGURE 7 is a sectional view taken on the line 7—7 of FIGURE 5.

FIGURE 8 is a side view of the magazine.

FIGURE 9 is a fragmentary front view, partly in section, showing the flash unit without the reflector.

FIGURE 10 is a view similar to FIGURE 9, the transport device being shown in a position which it occupies during the loading step.

FIGURE 11 is a view similar to that of FIGURE 10, the transport device being shown at the end of the loading step.

Referring now to the drawings, there is shown a flash unit comprising a housing 1 in which a reflector 2 is embedded, the housing 1 being attached to a connecting stud 3. The reflector is formed with an elongated guide slot 4 extending from the top to the middle, a central opening 5, and a lower discharge opening 6. The housing 1 is adapted to have a flash bulb magazine 12 attached to it, as will be described in greater detail below, in such a manner that flash bulbs $5^I$, $5^{II}$, $5^{III}$, $5^{IV}$ and $5^V$ may pass from the magazine through the slot 4 into a position occupied by the bulb 5a, as shown in FIGURE 3. The rear of the housing 1 is closed by a rear wall 7 which is formed with arcuate cut-outs 16 and $16^I$, these cut-outs being concentric with an electrical socket 9 which is in alignment with the opening 5. The rear wall 7 is formed with additional cut-outs $7^I$ and $7^{II}$.

The flash unit further comprises a transport device constituted by a feed disk 8 which is mounted for rotation by the socket 9 about an axis which coincides with that of the opening 5. The disk is provided with actuating handles $8^I$ and $8^{II}$ which project rearwardly through the arcuate slots 16 and $16^I$, so that the disk may be turned by manipulation of these handles. The disk is formed with an abutment rim 8a having a receiving cut-out corresponding in size to that of one of the flash bulbs, with a curved feed channel $8^{III}$ which leads from the cut-out of the rim 8a to the socket 9, and with an inner abutment $8^{IV}$. The housing additionally contains the other electrical components of the flash unit, namely, a capacitor 10 and a battery 11. The electrical interconnections between these parts and a switch (not shown) are conventional and are, therefore, not illustrated.

The magazine 12 consists of a single piece of thermoplastic and preferably transparent material, and may be made by an injection molding process. The magazine 12, which has an elongated ovaloid cross section, as shown in FIGURES 6 and 7, is formed with an internal partition wall 13a extending throughout the length of the magazine and having a central longitudinal slot 13. The flash bulbs within the magazine have socket portions of reduced cross section, it being these last-mentioned portions which pass through the slot 13, thereby holding the flash bulbs in place.

The magazine 12 is formed at its bottom, i.e., at its output end, with a base portion 17 having sides $17^I$, this base portion being received in a correspondingly shaped recess 18a at the upper part of the housing 1, as shown best in FIGURE 4a. The bottom of the magazine 12 also has two lug portions 15 and $15^I$ which, when the magazine is mounted on the housing, as described below, are received in grooves 18. The lower end of the magazine 12, which constitutes an attaching portion, is additionally formed with an elongated slot 14 which extends upwardly from the bottom output end of the magazine. The construction of the magazine is such that when there is no stress on the lug portions 15 and $15^I$, i.e., when the magazine is not attached to the housing 1, the lowermost end of the slot 14 will be narrowed, as shown in FIGURE 5. However, when the magazine 12 is attached to the housing 1, the lug portions 15 and $15^I$ which project into the grooves 18, will be spread apart, thereby widening the lowermost end of the slot 14, as shown in FIGURE 4. To obtain this result, the grooves 18 which receive the lug portions 15 and $15^I$ diverge as they run from one side of the housing 1 towards the other, so that when the base portion 17 is placed partly into the recess 18a with the lugs 15 and 15¹ being received by the grooves 18 at a point where these grooves are relatively close together, and when the base portion 17 is then slid within the recess 18a towards the front side of the housing 1, as viewed in FIGURE 4a, the lug portions 15 and 15¹ will be cammed apart, thereby widening the slot 14. During this sliding movement, as well as after completion thereof, the sides 17¹ of the base portion 17 will engage the sides of the slot 18a, thereby steadying the magazine 12.

The significance of the widened slot 14 in the mounted and stressed state of the magazine 12 is the following: when the magazine is not mounted on the housing 1, the narrowed bottom end of the slot 14 will frictionally engage the lowermost of the flash bulbs in the magazine with a force sufficient to prevent the series of flash bulbs from dropping out of the magazine. However, when the slot 14 is widened, in the manner explained above, there will be nothing to prevent the flash bulbs from moving out of the output end of the magazine under the influence of gravity, and it is precisely this gravity-feed which is relied on to feed consecutive flash bulbs through the receiving cut-out in rim 8a into the curved feed channel 8ᴵᴵᴵ.

For optimum results, the grooves 18 are so arranged that the slot 14 will not be widened sufficiently to allow the flash bulbs to pass through the bottom end of the magazine until the magazine has been completely or almost completely attached to the housing 1.

The operation of the transport device is as follows:

The disk 8 is rotated by turning the handles 8ᴵ and/or 8ᴵᴵ. As soon as the receiving cut-out of the rim 8a comes into alignment with the magazine 12, the lowermost flash bulb in the magazine drops into the feed channel 8ᴵᴵᴵ until it comes into engagement with the abutment 8ᴵⱽ, the free passage of this flash bulb through the bottom output end of the magazine being made possible in the manner explained above. This is shown in FIGURE 9. As the disk 8 is rotated further, the rim 8a will prevent the next flash bulb from dropping. The rotation of the disk 8 will also cause the flash bulb in the feed channel 8ᴵᴵᴵ to be moved downwardly through the vertical slot 4 towards the opening 5 where this bulb will engage and ultimately displace the spent bulb still in the socket 9, thereby ejecting this last-mentioned bulb through the opening 6, as shown in FIGURE 10. Upon continued rotation of the disk 8, the new bulb will itself enter the socket 9, and this is shown in FIGURE 11. To make possible this type of ejection, the socket 9 is of such construction that it will readily retain a flash bulb but will be able to release it when the camming effect on the fresh flash bulb, which is produced by the interaction of the curved feed channel 8ᴵᴵᴵ and the vertical guide slot 4, causes this new flash bulb to engage the spent bulb.

It will be appreciated that the above-described structure is readily susceptible to mass production techniques, particularly, the magazine which, as stated before, can be made as a single piece by an injection molding process. Furthermore, the manner in which fresh bulbs are moved to replace spent bulbs entails the use of but a single moving part, so that the operation of the device is exceptionally trouble-free.

Moreover, the magazine itself may constitute the original container for the flash bulbs, so that the consumer will be able to take the flash bulb container and use it as the magazine without it being necessary for him to purchase the bulbs separately and to load them into a magazine.

It will be understood that the above description of the present invention is susceptible to various modifications, changes and adaptations, and the same are intended to be comprehended within the meaning and range of equivalents of the appended claims.

I claim:
1. A flash unit comprising, in combination:
   (a) a housing having a bulb receiving portion and a flash bulb socket communicating with said receiving portion;
   (b) a flash bulb magazine adapted to contain, and normally to retain within it, a series of consecutive flash bulbs and constituting a self-contained unit which is connectable to said receiving portion of said housing with the series of flash bulbs one above the other, said magazine having a slotted attaching portion adapted to be spread apart when the magazine is connected to said receiving portion of said housing so that said bulbs may then leave said magazine and be fed into said receiving portion of said housing solely under the influence of gravity;
   (c) said housing and said magazine being provided with means for spreading said slotted attaching portion of said magazine, thereby widening the bottom end of said slot when said magazine is attached to said housing; and
   (d) a transport means on said housing for receiving flash bulbs from said receiving portion, for feeding them from there to said socket, and for thereafter ejecting them from said housing.

2. A flash unit as defined in claim 1 wherein said spreading means comprise lug portions on said magazine and horizontal grooves in said housing, said grooves diverging from one side of said housing towards the other, whereby when said magazine is slid from said one side towards the other while said lug portions are received in said grooves, respectively, said lug portions will be spread apart, thereby widening said bottom end of said slot, said lug portions and grooves being so arranged that said bottom end of said slot will be widened only when said magazine has been at least substantially completely attached to said housing.

3. A flash unit as defined in claim 1 wherein said transport means comprises a rotatably mounted feed disk having an abutment rim formed with a cut-out through which a fresh bulb is received, an abutment for retaining the fresh bulb received through said cut-out, and a feed channel for moving the fresh bulb to said bulb socket, the latter serving as a support for rotatably mounting said disk.

4. A flash unit as defined in claim 3 wherein said feed disk comprises a plurality of rearwardly extending handles and wherein said casing comprises a rear wall formed with a plurality of arcuate cut-outs concentric with the axis about which said disk is rotatable, said handles projecting through said cut-outs.

5. A flash unit as defined in claim 1 wherein said magazine, when disconnected from said housing, constitutes a packing container for flash bulbs contained therewithin.

6. In a flash unit, the combination which comprises: a housing having a flash bulb socket; and a transport means for receiving flash bulbs, for feeding them to said socket, and for thereafter ejecting them from said housing, said transporting means consisting of a single movable part in the form of a disk which is mounted on said housing for rotation about said socket, said disk having, at its periphery, a receiving portion within which a fresh flash bulb is received and a feed channel extending from said receiving portion to the center of the disk for moving the fresh bulb to said socket where the fresh bulb may engage and eject a spent bulb held by said socket.

7. In a flash unit, the combination which comprises: a housing having a reflector formed with a central opening, a guide slot extending from the top of said reflector to said central opening, and a discharge opening below said central opening; a flash bulb socket carried by said housing and in alignment with said central opening;

and a feed disk mounted on said housing for rotation about said socket and having at its rim a receiving portion and a feed channel extending from said receiving portion to the center of said disk, said feed disk being located close to said reflector and rotating through an arc wherein first that end of said feed channel which is at said receiving portion and finally that end of said feed channel which is at said center of said disk is in alignment with said guide slot so that upon rotation of said feed disk a fresh bulb in said receiving portion and slidably arranged in said guide slot will be cammed toward said socket and, upon engagement of a spent bulb in said socket, displace said spent bulb and eject the same through said discharge opening.

References Cited in the file of this patent

UNITED STATES PATENTS

| | | |
|---|---|---|
| 1,955,559 | Narrow | Apr. 17, 1934 |
| 2,437,956 | Hessel | Mar. 16, 1948 |
| 2,672,039 | Schwartz et al. | Mar. 16, 1954 |
| 2,774,861 | Shaw et al. | Dec. 18, 1956 |
| 2,835,787 | Mihalyi | May 20, 1958 |
| 2,864,938 | Shaw et al. | Dec. 16, 1958 |
| 3,015,023 | Dayton et al. | Dec. 26, 1961 |